US006426717B1

(12) United States Patent
Maloratsky (10) Patent No.: US 6,426,717 B1
(45) Date of Patent: Jul. 30, 2002

(54) SINGLE ANTENNA FM RADIO ALTIMETER OPERATING IN A CONTINUOUS WAVE MODE AND AN INTERRUPTED CONTINUOUS WAVE MODE

(75) Inventor: Leo G. Maloratsky, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/853,509

(22) Filed: May 11, 2001

(51) Int. Cl.⁷ .............................................. G01S 13/32

(52) U.S. Cl. ...................................... 342/122; 342/120

(58) Field of Search .................. 342/118–123, 127–135, 342/175, 195, 200–205, 82–103, 104–117

(56) References Cited

U.S. PATENT DOCUMENTS

| | | | |
|---|---|---|---|
| 3,102,263 A | * 8/1963 | Meyer | 342/113 |
| 3,271,763 A | * 9/1966 | Colby, Jr. | 342/88 |
| 3,334,344 A | * 8/1967 | Colby, Jr. | 342/84 |
| 3,543,270 A | 11/1970 | Wiley, Jr. | |
| 3,566,406 A | 2/1971 | Kabell et al. | |
| 3,588,899 A | 6/1971 | Strauch | |
| 3,611,370 A | * 10/1971 | Frasure et al. | 342/82 |
| 3,611,378 A | 10/1971 | Goult et al. | |
| 3,739,379 A | 6/1973 | Davis | |
| 4,509,049 A | 4/1985 | Haendel et al. | |
| 4,599,618 A | 7/1986 | Haendel et al. | |
| 4,695,013 A | 9/1987 | Trampnau | |
| 4,739,330 A | 4/1988 | Lazarus | |

OTHER PUBLICATIONS

K. Hickey et al., "Measurement of Ocean Surface Currents Uisng a Long–Range, High–Frequency Ground Wave Radar"; IEEE Journal of Oceanic Engineering, (vol. 19, No. 4; Oct. 1994; pp. 549–554).*

N. Allan et al., "X–Band Dual–Beam Doppler Radar Observation of the Chesapeake Bay Outflow Plume"; IEEE Geoscience and Remote Sensing Symposium Proceedings (IGARSS '98), (vol. 4; 1998; pp. 2210–2212).*

P. D. L. Beasley, A. G. Stove, B. J. Reits, "Solving the Problems of a Single Antenna Frequency Modulated CW Radar," IEEE International Radal Conference, 1990.

Karode, S. L. and Fusco, V. F., "Feedforward Embedding Circulator Enhancement In Transmit/Receive Application," *IEEE Microwave and Guided Wave Letters*, vol. 8, No. 1, Jan. 1998.

* cited by examiner

Primary Examiner—Bernarr E. Gregory
(74) Attorney, Agent, or Firm—Nathan O. Jensen; Kyle Eppele (57) ABSTRACT

A single antenna FM radio altimeter operates in continuous wave (CW) and interrupted continuous wave (ICW) modes to provide an altitude indication. An altimeter transmitter generates a constant FM period CW signal below a critical altitude and a variable FM period ICW signal above the critical altitude. The single antenna, connected to the transmitter and receiver, radiates and receives the CW and the ICW signals. The receiver provides a beat frequency signal. A processor compares the beat frequency signal and the variable FM period signal to critical altitude reference signals and switches the altimeter between the modes accordingly. The processing function provides the transmitter a constant period modulation signal below the critical altitude and a variable FM period signal above the critical altitude. The processing function provides the altitude indication from the beat frequency signal below the critical altitude and from the variable FM period signal above the critical altitude.

21 Claims, 10 Drawing Sheets

*FIG. 1*

PRIOR ART

SINGLE ANTENNA FM RADIO ALTIMETER OPERATING IN A CONTINUOUS WAVE MODE AND AN INTERRUPTED CONTINUOUS WAVE MODE

BACKGROUND OF THE INVENTION

This invention relates to altimeters, FM-CW (frequency modulated continuous wave) and more specifically to single antenna FM altimeters.

As is well known, there are generally two types of altimeter systems, one known as a pulse radar altimeter and the other as a FM-CW radio altimeter. In the pulse radar altimeter, a series of RF pulses are transmitted towards the ground and a receiver is operated to detect the return of the transmitted pulses that are reflected from the ground. The time delay between the transmitted and received pulses is proportional to the distance to the ground. By accurately controlling the transmission and detection of such pulses, highly accurate information can be obtained with respect to distance to the ground.

In a FM-CW radio altimeter system, a continuous RF signal is repetitively swept by a frequency-modulating signal in a transmitter and the resulting modulated carrier is transmitted towards the ground. The FM signal is reflected by the ground and returned toward a receiver for reception. A portion of the transmitted signal is mixed with the reflected signal to produce a beat frequency indicative of the distance from the transmitter to the ground. By controlling the modulation of the transmitted signal and by detecting the beat frequency, accurate readings of the distance to the ground can be determined.

Aircraft FM-CW radio altimeters typically operate at altitudes from 0 to 8000 feet utilizing separate antennas for transmit and receive. Two-antenna FM-CW radio altimeters have several disadvantages. One disadvantage is the high cost and weight of cables and antennas especially in double or triple redundant radio altimeter systems on such aircraft as commercial airliners. With two antennas, multipath or double bounce is an additional disadvantage. With double bounce strong signals from the transmit antenna reflect from the ground to the fuselage of the aircraft, back to the ground and back again to the receiver antenna giving an altitude indication about twice the actual altitude. Another disadvantage with a two antenna FM-CW radio altimeter system is the requirement for high isolation between transmitter and receiver antennas resulting in rigid requirements for antenna side lobe suppression and for the antenna locations on the aircraft fuselage. The spacing between the two antennas must be large to obtain high isolation. However, this results in poor accuracy at low altitudes of the order of meters because the distance between the transmitter and receiver antenna is greater than the aircraft altitude. The spatial diversity of two separate transmitter and receiver antennas results in their isolation of no better than 75–90 dB, which restricts the maximum working altitude of an altimeter due to leakage between the antennas. Amplitude discrimination is typically used in a FM-CW altimeter to keep the system from. locking on to the leakage signal instead of the real signal. Many problems have occurred in the past with antennas failing or cable connectors loosening or degrading to cause the leakage signal to rise above the desired altitude return signal. These problems may result in the altimeter system ramping down to zero or some low altitude when an aircraft is actually at cruise altitudes (>30,000 feet).

Some of the disadvantages of a two-antenna FM-CW system may be eliminated with a single antenna system. A single-antenna aircraft FM-CW altimeter system is disclosed in U.S. Pat. No. 4,739,330. This disclosed single-antenna FM-CW altimeter operates in a pulse mode where a transmitter transmits for a short period and then a transmit-receive switch switches the antenna to a receiver for another short period. This approach has several disadvantages that limit its utilization as an aircraft altimeter. Typical aircraft FM-CW altimeter requirements are to measure altitudes from 0 to 8000 feet with an accuracy of ±1.5 ft (46 cm) for low altitudes and ±2% for high altitudes. At the low altitudes, these requirements are difficult to meet with the pulse mode of the disclosed system. In the pulse mode altitude measurements near 1.5 feet require a pulse width of about 3 nanoseconds with a repetition rate of near 300 MHz resulting in a receiver bandwidth of 1.5 GHz. These parameters cannot be easily realized in an aircraft radio altimeter with low cost, weight, and size.

Also in the aforementioned patent in the pulse mode during receive the transmitter is disconnected from the antenna with the transmit receive switch but the transmitter continues to operate at maximum power consuming twice the necessary power. With the transmitter still operating at full power in the receive mode, leakage of the transmitter signal will interfere with the receiver especially at high altitudes, where the return signal is the lowest level.

With a single antenna radio altimeter in a non-pulse or continuous wave (CW) mode, the transmitter and receiver are both operating simultaneously. The single antenna can never be perfectly matched to free space and there will always be some transmitter signal reflected back toward the receiver. At the low altitudes, leakage of a CW transmitter signal reflected from the mismatched antenna or from other elements between the transmitter and the single antenna into receiver channel is a problem that limits the performance of the altimeter.

What is needed is a single antenna FM radio altimeter system that provides improved performance over two antenna radio altimeter systems while solving the attendant problems of a single antenna altimeter.

SUMMARY OF THE INVENTION

A FM radio altimeter with a single antenna capable of operating in a continuous wave mode and an interrupted continuous wave mode to provide an altitude indication is disclosed. The single antenna FM radio altimeter includes a transmitter for generating a continuous wave altimeter signal with a constant FM modulation period below a critical altitude and an interrupted continuous wave altimeter signal with a variable FM modulation period above a critical altitude. A circulator is connected to the transmitter for providing isolation and for coupling the continuous wave altimeter signal and the interrupted continuous wave signal to the single antenna. The single antenna is connected to the circulator for radiating the continuous wave altimeter signal and the interrupted continuous wave altimeter signal and receiving a reflected continuous wave altimeter signal and a reflected interrupted continuous wave altimeter signal. A receiver is connected to the circulator for receiving the reflected continuous wave altimeter signal and the reflected interrupted continuous wave altimeter signal and for providing an altimetric beat frequency signal. A processing function compares the altimetric beat frequency signal from the receiver to a critical altitude reference beat frequency and switches the altimeter from the continuous wave mode when the altimetric beat frequency signal is below the critical altitude reference beat frequency to the interrupted continuous wave mode when the altimetric beat frequency signal is above the critical altitude reference beat frequency. The processing function provides the transmitter a constant period modulation signal below the critical altitude and a variable FM modulation period signal above the critical altitude. The processing function provides the altitude indication from the altimetric beat frequency signal below the critical altitude and from the variable FM modulation period signal above the critical altitude.

The single antenna FM radio altimeter transmitter further comprises a voltage controlled oscillator for providing a continuous wave altimeter signal with the constant FM modulation period below the critical altitude and a with the variable FM modulation period signal above the critical altitude. A coupling element is connected to the voltage-controlled oscillator for providing a local oscillator signal coupled from the continuous wave altimeter signal. A power amplifier is connected to the coupling element for amplifying the continuous wave altimeter signal. A pulse modulator is connected to the power amplifier for modulating the power amplifier to provide the interrupted continuous wave altimeter signal above the critical altitude.

The single antenna FM radio altimeter receiver further comprises a preselector connected to the circulator for amplifying and filtering the reflected continuous wave altimeter signal and the reflected interrupted continuous wave altimeter signal. A mixer is connected to the preselector for mixing the reflected continuous wave altimeter signal and the reflected interrupted continuous wave altimeter signal with the local oscillator signal to provide the altimetric beat frequency signal. A fourth switch is connected to the mixer and the coupling element for switching the local oscillator signal provided by coupling element. A beat frequency amplifier is connected to the mixer for amplifying the altimetric beat frequency signal. A filter is connected to the beat frequency amplifier for filtering parasitic signals. A dynamic selector is connected to the filter for selecting a true altitude indication.

The single antenna FM radio altimeter processing function further comprises a comparator connected to the dynamic selector for comparing the altimetric beat frequency signal to a critical altitude reference beat frequency. The comparator switches the altimeter from a continuous wave altimeter signal when the altimetric beat frequency signal is below the critical altitude reference beat frequency to an interrupted continuous wave altimeter signal when the altimetric beat frequency signal is above the critical altitude reference beat frequency. The comparator also compares the variable FM modulation period signal to a critical altitude reference modulation period and switches the altimeter from the interrupted continuous wave altimeter signal when the variable FM modulation period is above the critical altitude reference modulation period to the continuous wave altimeter signal when the variable FM modulation period is below the critical altitude reference modulation period. A searching and tracking network is connected to the dynamic selector for generating a correction signal in the interrupted continuous wave mode. A FM period regulator is connected to the searching and tracking network for providing a FM period control signal in accordance with the correction signal in the interrupted continuous wave mode. A first switch is connected to the FM period regulator and the modulator for providing the FM period control signal in the interrupted continuous wave mode and a constant modulation period control signal in the continuous wave mode. A third switch is connected to the dynamic selector and the comparator for selecting the altitude indication from the dynamic selector in the continuous wave mode and from the FM period regulator in the interrupted continuous wave mode.

It is an object of the present invention to provide a FM radio altimeter that will operate with one antenna.

It is an object of the present invention to improve isolation between the transmitter and receiver in a FM radio altimeter.

It is a feature of the present invention to provide improved accuracy at low altitude by eliminating one antenna in a FM radio altimeter system.

It is an advantage of the present invention to lower cost and weight of a FM radio altimeter system by eliminating an antenna and its associated cables.

DETAILED DESCRIPTION

Figure 1:
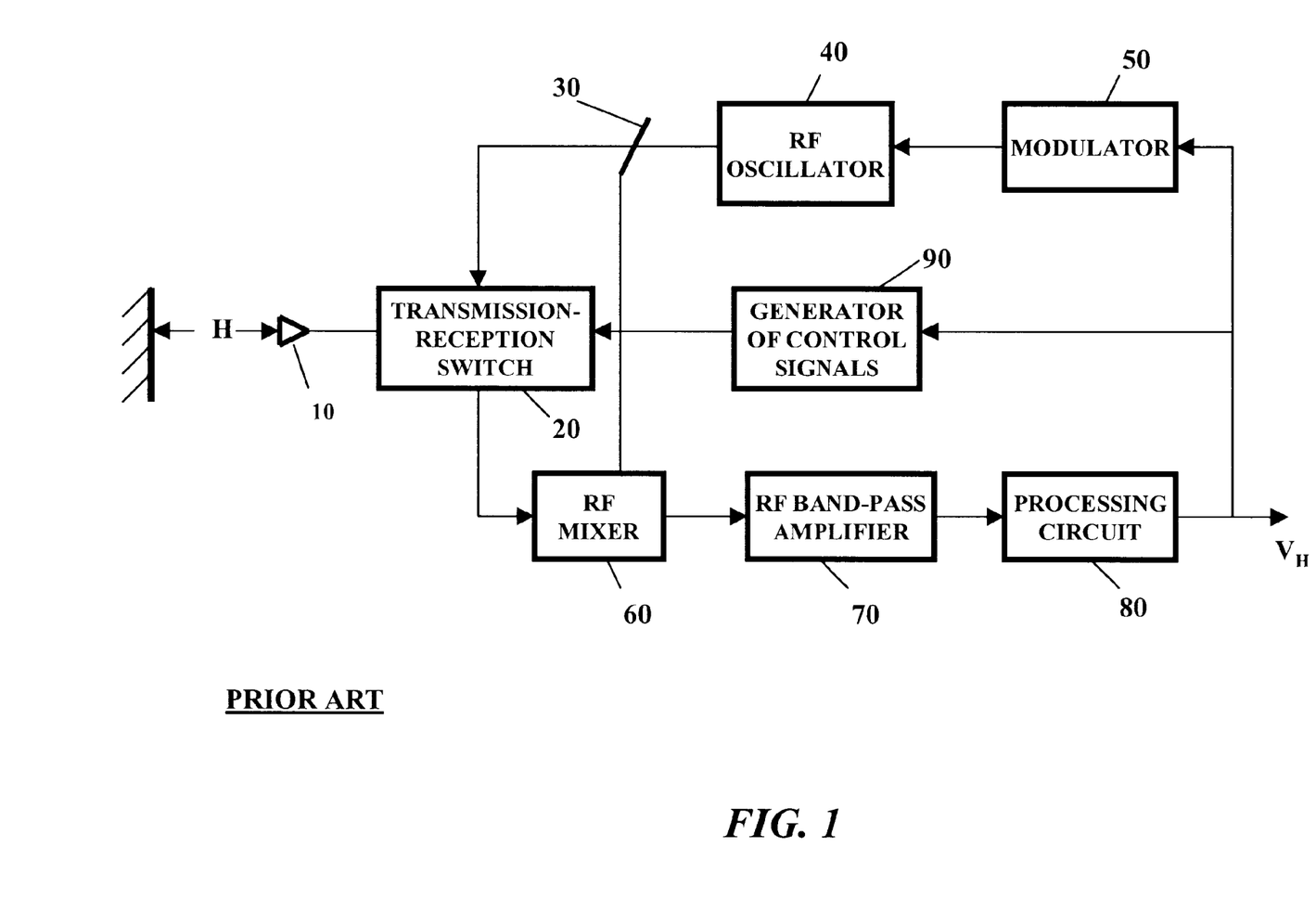
FIG. 1 is a block diagram of a prior art single antenna FM radio altimeter.

A block diagram of a single antenna radio altimeter disclosed in U.S. Pat. No. 4,739,330 is shown in FIG. 1. In this prior art radio altimeter, a directional antenna 10 is connected to a transmission-reception switch 20 controlled by a signal generator 90. The generator 90 delivers a periodic signal to switch the altimeter from transmit to receive. The periodic signal recurrence period is at all altitudes proportional to the delay time of a ground signal. A transmitter includes RF oscillator 40, frequency modulated by a saw tooth signal from modulator 50, whose FM period is proportional to the delay time of the ground return signal.

A homodyne receiver includes RF mixer 60, band-pass amplifier 70 and processing circuit 80 for acquiring and tracking the ground return signal. The receiver supplies an output beat frequency signal indicating the altitude and for controlling the signal generator 90 to control the transmission-reception switch 20 and the recurrence period of the modulator 50.

The prior art single-antenna FM-CW altimeter shown in FIG. 1 has several disadvantages and restrictions that limit its used as an aircraft altimeter. Typical aircraft FM-CW altimeter requirements are to measure the altitudes from 0 to 8000 ft with an accuracy of ±1.5 ft (46 cm) for low altitudes and +2% for high altitudes. At the low altitudes, such requirements cannot be met in a pulse mode of the disclosed system. In the pulse mode, measurement of altitudes near 1.5 feet requires a pulse width of about three nanoseconds with a recurrence frequency near 300 MHz. This requires a receiver bandwidth near 1.5 GHz.

In the pulse mode during receive the prior art altimeter disconnects the transmitter from the antenna 1 with the transmission-reception switch 2 but the transmitter continues to operate at maximum power consuming twice the necessary power. In addition with the transmitter still operating at full power in the receive mode, leakage of the transmitter signal will interfere with the receiver especially at high altitudes, where the return signal is the lowest level.

Figure 2:
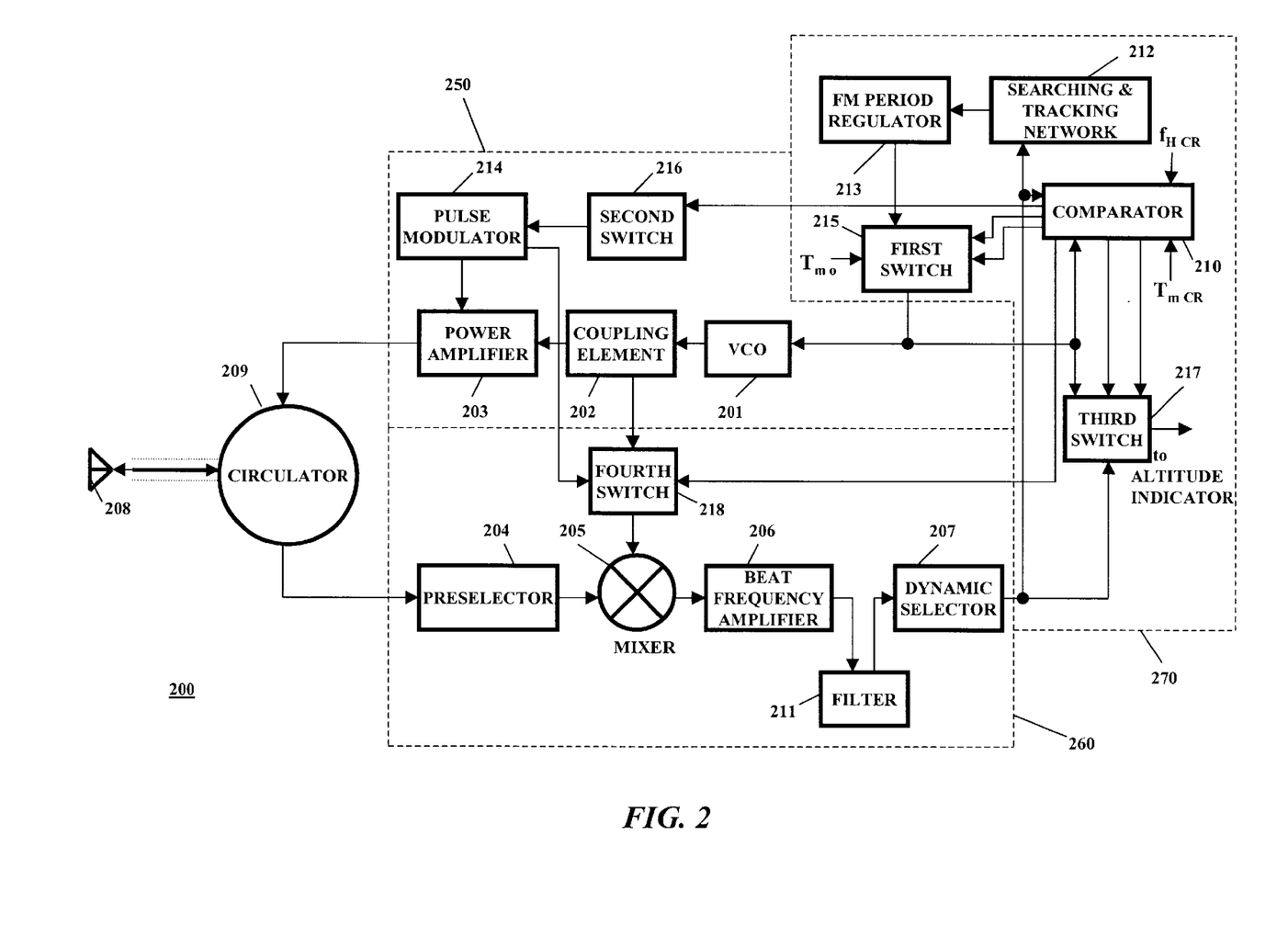
FIG. 2 is a block diagram of a single antenna FM radio altimeter in accordance with the present invention.

A single antenna FM radio altimeter 200 according to the present invention is shown in FIG. 2. The radio altimeter 200 operates in a continuous wave (CW) mode at all altitudes that are equal to or lower than a predetermined critical altitude $H_{CR}$, and in an interrupted continuous wave (ICW) mode at all altitudes that are greater than this critical altitude. The single-antenna FM radio altimeter 200 according to the present invention comprises a transmitter 250, a receiver 260, and processing function 270 as shown in FIG. 2. In the CW mode, the FM radio altimeter 200 of the present invention operates with the transmitter 250 and receiver 260 on at the same time as in a conventional FM-CW altimeter. When in the ICW mode the transmitter 250 is pulsed on and off with the receiver 260 disabled when the transmitter 250 is on. The receiver 260 receives the altimeter signal reflected from the ground during the off time of the transmitter 250. When in the ICW mode, the period of the frequency modulation becomes equal or less than a critical value corresponding to the critical altitude, the CW mode is switched on. In the CW mode, when an altimetric beat frequency becomes equal or more than a maximum corresponding to the critical altitude, the ICW mode is enabled.

Several blocks of a conventional FM-CW altimeter are utilized in the single antenna FM altimeter 200 present invention shown in FIG. 2. In the transmitter 250 these blocks include a voltage-controlled oscillator (VCO) 201 that generates the altimeter RF signal. A coupling element 202 such as a directional coupler couples some of the VCO 201 output for use as a local oscillator signal for the receiver 260. A power amplifier 203 amplifies the modulated VCO signal.

In the receiver 260, blocks from a conventional FM-CW altimeter include a preselector 204 that amplifies and filters the received signal reflected from the ground or some other object and a mixer 205 that uses the local oscillator signal from the coupling element 202 to convert the received signal to a baseband beat frequency signal whose frequency varies with altitude. A beat frequency amplifier 206 amplifies the variable beat frequency signal and a dynamic selector 207 selects and tracks a true altimetric beat frequency from the beat frequency amplifier. Some other means of tracking the desired FM-CW altimeter signals known in the art may also provide the desired altimetric beat frequency signal by selecting the lowest part of an altimetric spectrum of frequencies.

Blocks added to those of a conventional FM-CW altimeter described above included in the present invention are shown in FIG. 2 and discussed in the following paragraphs.

Among the blocks added to a conventional FM-CW altimeter are a single transmit/receive antenna 208 connected through a circulator 209 to the transmitter 250 and receiver 260. The circulator 209 is a conventional circulator commercially available to provide coupling of the transmitter 250 and the receiver 260 to the antenna 208 and isolation between the transmitter 250 and receiver 260.

In the transmitter 250, a pulse modulator 214 is added to modulate the power amplifier 203 to generate the interrupted CW signal. The transmitter 250 is pulsed with a constant pulse repetition period $T_{rm}$ that is equal to twice the delay time of the ground echo signal for a maximum aircraft altitude $H_{max}$. The pulse modulator 214 may be any type known in the art for modulating the power amplifier 203. A second switch 216 may be used to switch off the pulse modulator 214 in the CW mode and switch on the pulse modulator 214 in the ICW mode, this second switch 216 being controlled by a comparator 210. The comparator 210 may also turn the pulse modulator 214 on and off directly eliminating the second switch 216. The second switch 216 may be implemented in a power supply network (not shown) of the pulse modulator 214.

In the receiver 260, a filter 211 is added between the beat frequency amplifier 206 and the dynamic selector 207. The filter 211 suppresses a parasitic transmitter signal that may be reflected from the mismatched single antenna 208 and from other elements between the transmitter 250 and the antenna 208 in the CW mode. A fourth switch 218, coupled to the coupling element 202 and the mixer 205 switches on the local oscillator (LO) power from the transmitter 250 during the CW mode and during the ICW mode in the receiving half period and switches off the LO power during the ICW mode in the transmission half period. The fourth switch 218 is controlled by the pulse modulator 214 in the ICW mode. The fourth switch 218 may a conventional electronic single-pole single-throw (SPST) switch.

In the processing function 270 of the present invention, a two-criterion comparator 210 is connected to the output of the dynamic selector 207 and to an FM period regulator 213 through a first switch 215. The comparator 210 in the ICW mode compares the current value of the FM period regulator 213 variable modulation period $T_m$ with a critical altitude reference modulation period $T_{mCR}$ corresponding to the critical altitude $H_{CR}$. At values of the FM period equal or less than the critical value, the comparator 210 switches on the CW mode. In the CW mode, the comparator compares the current value of the variable altimetric beat frequency $f_H$ from the dynamic selector 207 with a critical altitude reference beat frequency $f_{HCR}$ corresponding to the critical altitude $H_{CR}$, so that at $f_H$ equal to or more than its maximum $f_{HCR}$, the comparator switches to the ICW mode.

In the processing function 270, a searching and tracking network 212, connected to the output of the dynamic selector 207, forms a value and sign of a correction signal for regulation of the FM period in the ICW mode by controlling the FM period regulator 213. The FM period regulator 213 varies the FM period of the modulating signal, such as a saw tooth or triangular waveform in proportion to the altitude so that the altimetric beat frequency $f_H$ is maintained equal to a predetermined constant value $f_{Ho}$ in the ICW mode.

The first switch 215 in the processing function 270 connects the VCO 201 to the output of the FM period regulator 213 in the ICW mode. This first switch 215 also provides a constant signal to the VCO 201 that corresponds to a predetermined constant value of the FM period $T_{mo}$ in the CW mode. A third switch 217 connects an external altitude indicator (not shown) to the output of the first switch 215 in the ICW mode, and to the output of the dynamic selector 207 in the CW mode to provide the altitude indication. The first switch 215 and the third switch 217 may be conventional electronic double-pole single-throw (DPST) switches.

The processing function 270 that includes the comparator 210, the searching and tracking network 212, the FM period regulator 213, the first switch 215, and the third switch 217 may be implemented in a digital processor. These functions may also be implemented in hardware blocks known in the art.

Figure 3:
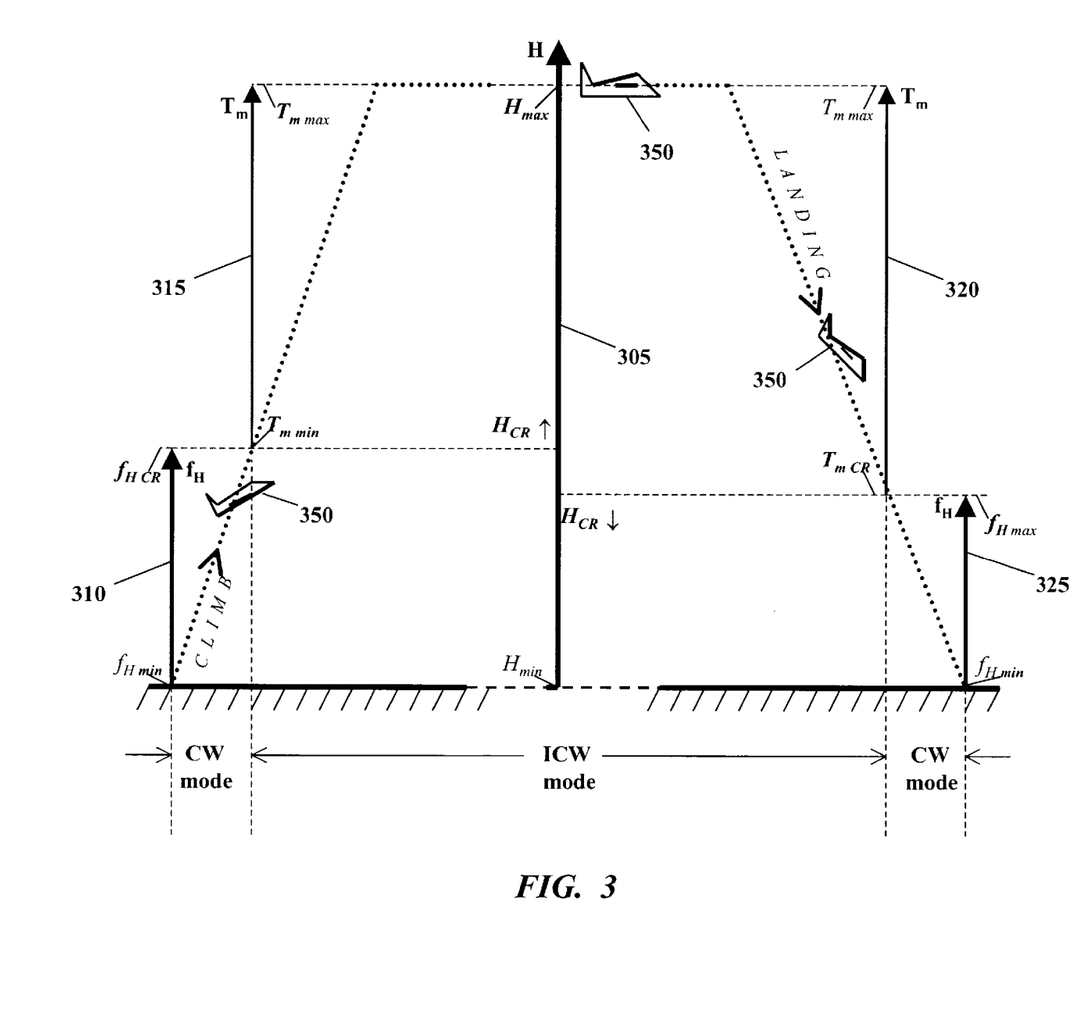
FIG. 3 is a diagram showing a typical flight path of an aircraft and the operation of the single antenna FM radio altimeter of FIG. 2.

The single antenna FM radio altimeter 200 of the present invention operates as described in the following paragraphs when in a flight as shown in FIG. 3. In FIG. 3 arrow 305 indicates the altitude H of an aircraft 350 over all portions of the flight, arrow 310 indicates the variable altimetric beat frequency $f_H$ in the CW mode during climb, arrow 315 indicates the variable FM modulation period $T_m$ in the ICW mode during climb, arrow 320 indicates the variable FM modulation period $T_m$ in the ICW mode during landing, and arrow 325 indicates the variable altimetric beat frequency $f_H$ in the CW mode during landing. From aircraft 350 take off and climb to an altitude less than the critical altitude ($H<H_{CR}$) the FM radio altimeter 200 is operating in the CW mode. The altimetric beat frequency is less than the critical altitude beat frequency ($f_H<fHCR$) and the comparator 210 places the switches in the following positions. The first switch 215 connects the VCO 201 to a reference source (not shown in FIG. 2) having the constant FM period $T_{mo}$ that is optimal for the CW mode. The second switch 216 switches off the pulse modulator 214. The third switch 217 connects the external altitude indicator to the output of the dynamic selector 207. The fourth switch 218 connects the coupling element 202 with the mixer 205 to provide a local oscillator signal from the transmitter 250 to the mixer 205.

At this stage of flight, the FM radio altimeter 200 operates in the CW mode with the modulation period $T_{mo}$=constant. In this mode the FM radio altimeter 200 operates in a mode similar to conventional FM-CW altimeters where the altimetric beat frequency changes in proportion to altitude H (see Equation 1 below) and is measured as a signal parameter representative of the altitude above the ground.

In the CW mode, the altimeter transmitted signal frequency deviation $W_0$ and FM modulation period $T_{mo}$ are maintained constant. The value of $T_{mo}$ may be selected to be much less than the critical altitude modulation period $T_{mCR}$ to have the altimetric beat frequency at the lowest altitude ($f_{H,min}$) in the CW mode be much greater than the constant altimetric beat frequency ($f_{Ho}$) in the ICW mode or $f_{H\,min}>>f_{Ho}$. With $T_{mo}$ constant in the CW mode, the altimetric beat frequency is proportional to the altitude H as given by Equation 1 below.

$$f_H=(2W_0/cT_{mo})H \qquad \text{Equation 1}$$

where c is the propagation speed of electromagnetic waves. A measurement of the altimetric beat frequency $f_H$ is a signal parameter representative of the altitude above the ground in the CW mode.

Large values of the altimetric beat frequency $f_H$ are needed for the lowest altitudes because high absolute precision of altitude H measurements require increasing of the number of $f_H$ periods corresponding to every foot of altitude. Thus at low altitudes in the CW mode there is no restriction on altimetric beat frequency for the maximum altitude $f_H$ max, which may be chosen as large as needed.

In FIG. 3 during climb when the altitude H increases to its critical value $H_{CR}$, the altimetric beat frequency $f_H$ reaches its maximum value $f_{HCR}$ for the CW mode. At $f_H>f_{HCR}$ the comparator 210 in the processing function 270 in FIG. 2 places the switches into the positions corresponding to the ICW mode as follows. The first switch 215 connects the VCO 201 to the output of the FM period regulator 213 to receive the variable FM modulation period signal $T_m$ and disconnects the reference source with the fixed modulation period reference $T_{m\,0}$. The second switch 216 switches on the pulse modulator 214 in the transmitter 250. The third switch 217 connects the external altitude indicator (not shown) to the output of the first switch 215 to receive the variable FM modulation period signal $T_m$. The fourth switch 218 switches on the local oscillator signal from coupling element 202 during the ICW mode in the receiving half period and switches off local oscillator signal during the ICW mode in the transmission half period. The fourth switch 218 is controlled by the pulse modulator 214 during transmit receive transitions.

When at the critical altitude $H_{CR}$ in the ICW mode, the VCO 201 through the first switch 215 is connected to the FM period regulator 213 and the reference modulation period for the critical altitude $T_{mCR}$ is set. In the ICW mode, the beat frequency $f_{Ho}$ is held constant by the searching and tracking network 212 and the FM modulation period $T_m$ varies with altitude H as shown by arrows 315 and 320 in FIG. 3. For all altitudes $H>H_{CR}$ the FM period $T_m$ (see Equation 2) varies in proportion to H and is measured as a signal parameter representative of the altitude above the ground. The variable FM modulation period signal $T_m$ is passed through the third switch 217 to the altitude indicator.

In FIG. 3 during the landing stage of flight, the decreasing altitude H crosses $H_{CR}$ and the FM period $T_m$ crosses $T_{mCR}$, and the comparator 210 returns the switches into the positions previously described for the CW mode. The FM radio altimeter 200 continues to operate in the CW mode until the aircraft 350 lands.

In the ICW mode, variable FM modulation period $T_m$ varies in proportion to the altitude H to maintain the altimetric beat frequency $f_{Ho}$ constant at all altitudes. Keeping the altimetric beat frequency constant allows a narrowing of the receiver bandwidth and a corresponding improvement of the receiver sensitivity (improving the signal-to-noise ratio). In the ICW mode, the variable FM modulation period $T_m$ shown by arrows 315 and 320 in FIG. 3 is equal to $$T_m=(2W_0H)/(cf_{Ho}) \qquad \text{Equation 2}$$

and may be measured as parameter representative of the altitude H above the ground.

At higher altitudes in the ICW mode, the pulse repetition frequency $F_{rm}$ needed to pulse modulate the transmitter 250 for the maximum altitude $H_{max}$ may be determined from Equation 3 below.

$$F_{rm}=c/4H_{max} \qquad \text{Equation 3}$$

The predetermined pulse repetition frequency $F_{rm}$ may be selected much greater than the constant altimetric beat frequency $f_{Ho}$ ($F_{rm}>>f_{Ho}$). The pulse repetition frequency $F_{rm}$ is not critical for the measurement of the variable FM modulation period $T_m$ in the ICW mode. For example, for $H_{max}$=8000 ft the pulse repetition frequency $F_{rm}$ from Equation 3 is 31 kHz. The predetermined altimetric beat frequency $f_{Ho}$ should be much less than $F_{rm}$ and provide good accuracy in the ICW mode. For $f_{Ho}$=0.5 kHz ($T_{Ho}$=2 msec), the number of pulse modulator 214 pulses (N) during a half beat frequency period ($T_{Ho}/2$=1 msec) is N=($T_{Ho}/2$)/(1/$F_{rm}$)=1 msec/(1/31 kHz)=1 msec/0.032 msec=32 pulses.

Over the half beat frequency period the beat frequency is zero for 32 pulses or every 180°/32=5.6° when transmitting. The accuracy in the ICW mode is $$\frac{\pm(5.6/2)}{180} \times 100\% = \pm 1.55\%,$$

which is acceptable for high altitudes.

FIG. 3 shows a different $H_{CR}$ for climb and landing. During landing or take off, a horizontal flight at or near the critical altitude $H_{CR}$ is possible that may cause undesirable irregular switching between the CW and the ICW mode. This effect may be eliminated if the comparator 210 has two independent thresholds at the critical altitude $H_{CR}$. In the CW mode the critical altitude threshold increases $H_{CR}\uparrow$ for switching from the CW mode to the ICW mode and the critical altitude threshold decreases $H_{CR}\downarrow$ for switching from ICW mode to CW mode as shown in FIG. 3. The thresholds may be reversed from that shown in FIG. 3 with the threshold for switching from the CW mode to the ICW mode being lower than the threshold for switching from the ICW mode to the CW mode.

With a single antenna radio altimeter 200 in the CW mode, obtaining time isolation between transmitter and receiver channels is very difficult. The antenna 208 can never be perfectly matched to free space and some transmitter signal will be reflected back toward the receiver 260 from the antenna 208. At low altitudes, leakage of a CW transmitter signal reflected from the mismatched antenna 208 or from other elements between the transmitter 250 and the single antenna 208 into receiver 260 is a problem. It is difficult to separate the signal reflected from the ground from that reflected from the antenna 208. With the single antenna FM altimeter 200 of the present invention, filtration may be used to resolve the parasitic reflected signal problem.

Figure 4:
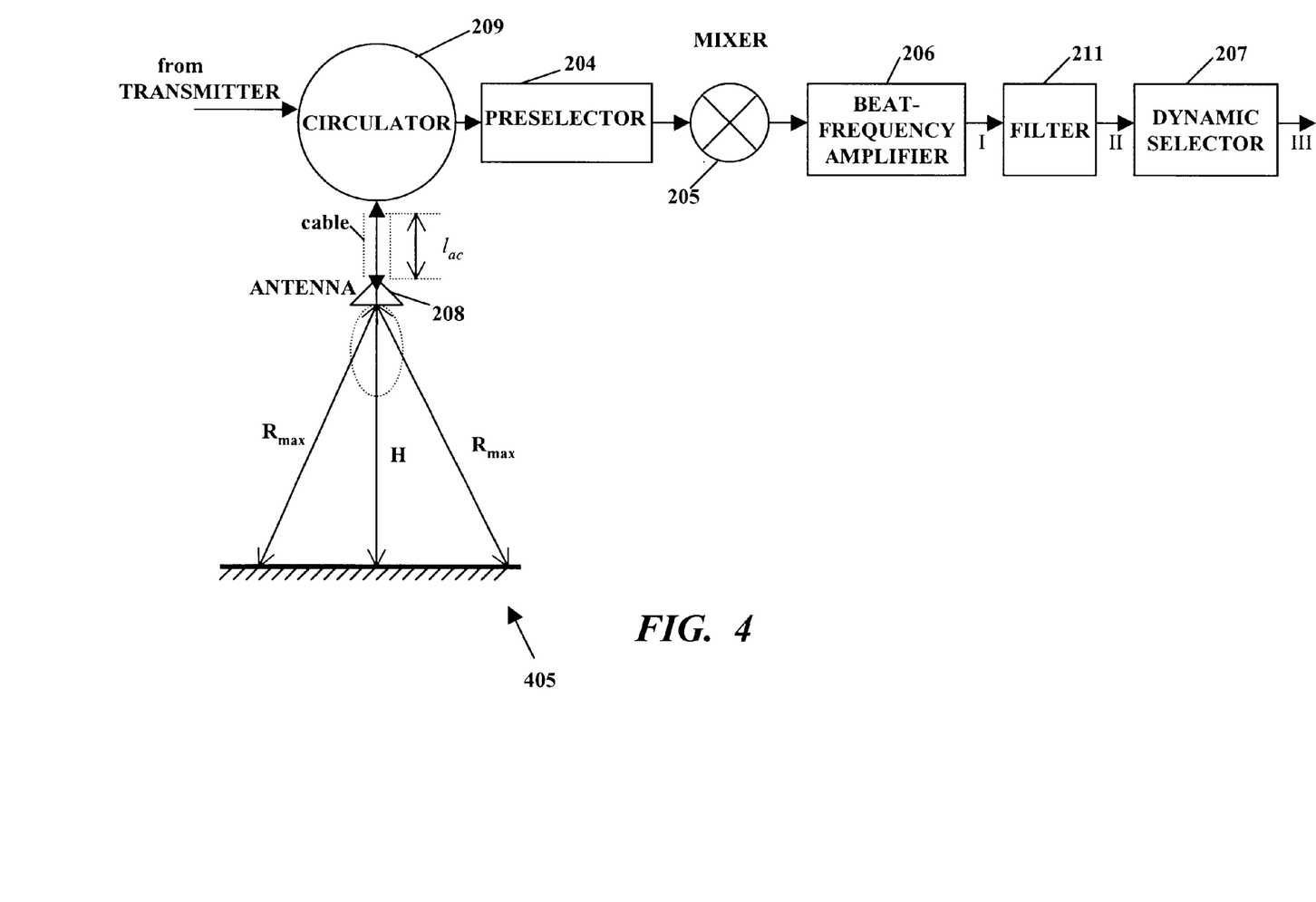
FIG. 4 is a diagram showing operation of a parasitic signal rejection filter in the single antenna FM radio altimeter of FIG. 2.
Figure 5:
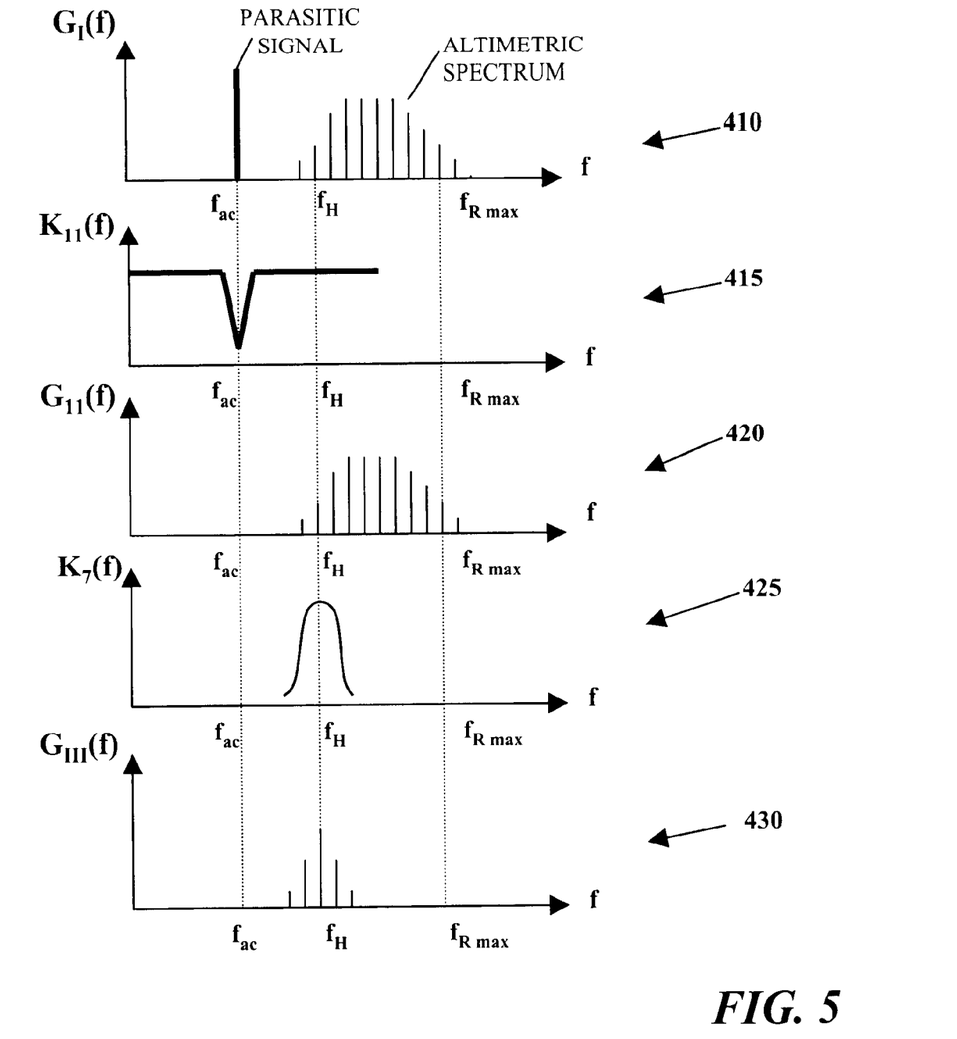
FIG. 5 is a diagram showing spectral displays that are useful in explaining FIG 4.

Using filtration, a parasitic signal rejection function illustrated in FIGS. 4 and 5 may be utilized as follows. The CW parasitic signal of the transmitter 250, reflected from the mismatched antenna 208, has a constant frequency $$f_{ac} = \gamma \times (2l_{ac}/c) \qquad \text{Equation 4}$$

where $\gamma=2W_0/T_m$ and $l_{ac}$ is the length of the antenna cable connecting the antenna 208 to the circulator 209 (FIG. 4). The bandwidth of this parasitic signal is much less than the bandwidth of the useful altimetric echo signal reflected from the extended ground surface. The filter 211 in the receiver 260 may be a narrow stop-band filter or high pass filter to suppress the parasitic signal without any distortion of the altitude measurement.

The narrow stop-band (or high-pass) filter 211 in the receiver 260 suppresses signals of the transmitter 250, reflected from the mismatched antenna 208 or from other elements between the transmitter 250 and the antenna 208. FIG. 4 illustrates an example with a narrow stop-band filter 211. Filter 211 is tuned to frequency $f_{ac}$ (Equation 4) to suppress the parasitic signal of the transmitter 250 reflected from the mismatched antenna 208. In FIG. 4 diagram 405 shows elements of the receiver 260, the circulator 209, and antenna 208 from FIG. 2 and the relationship of the cable length $l_{ac}$, antenna 208, and altitude H for the FM altimeter 200. In FIG. 5 a spectral display 410 shows the spectral components of the received signal at point I in diagram 405. Spectral display 415 is a typical frequency characteristic for the narrow stop-band filter 211. Spectral display 420 shows the spectral components at the point II in diagram 405 with the parasitic signal removed by the filter 211. Spectral display 425 is the current frequency characteristic of the dynamic selector 207, which selects the lowest part of altimetric spectrum, corresponding to the true altitude H. Spectral display 430 illustrates the lowest frequency spectral components at point III in diagram 405 selected by the dynamic selector 207. The frequency $f_{ac}$ of parasitic signal must always be less than the lowest frequency of the echo signal altimetric beat frequency $f_H$. Suppression of all parasitic signals reflected from elements between the transmitter 250 and the antenna 208 is obtained with a high-pass filter response for filter 211.

In the ICW mode, time isolation of transmitter 250 and receiver 260 is obtained when the ground echo signal is received during the pauses between the transmitter pulses. The receiver 260 is not receiving when the transmitter 250 is transmitting. At the highest altitudes, these pauses can not exceed 20 to 30 µs. The variable FM modulation period $T_m$ usually exceeds several milliseconds. The pulse modulation is inside the FM period and should not interfere with the received signal.

The transmitter pulse modulation characteristics should be optimized in the ICW mode. For the best sensitivity, a pulse signal with a maximum duty circle (DC) of 50% is needed where $DC=t_i/T_{rm}=0.5$ and where $t_i$ is the pulse width and $T_{rm}$ is the repetition period. At the maximum altitude $H_{max}$, the best sensitivity of the receiver can be realized if the pulse width $t_i$ as well as the width of the pause $t_{ps}$ are equal to the delay time of the echo signal from the ground ($t_{Hm}=2H_{max}/c$) and correspondingly the ICW pulse repetition period is $$T_{rm}=t_i+t_{ps}=4H_{max}/c \qquad \text{Equation 5}$$

Figure 6:
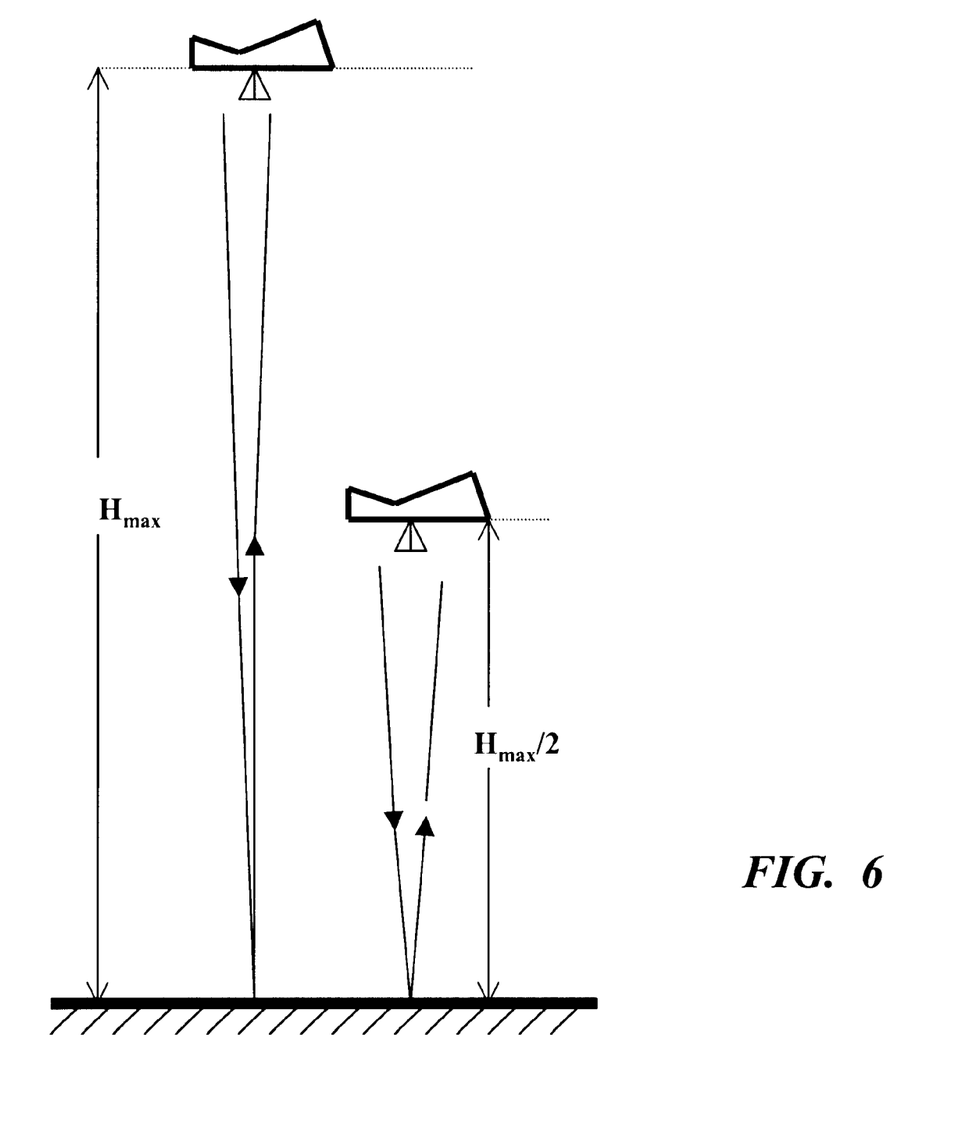
FIG. 6 is a diagram showing an aircraft at different altitudes during operation of the single antenna FM radio altimeter of FIG. 2 in an interrupted continuous wave mode.
Figure 7:
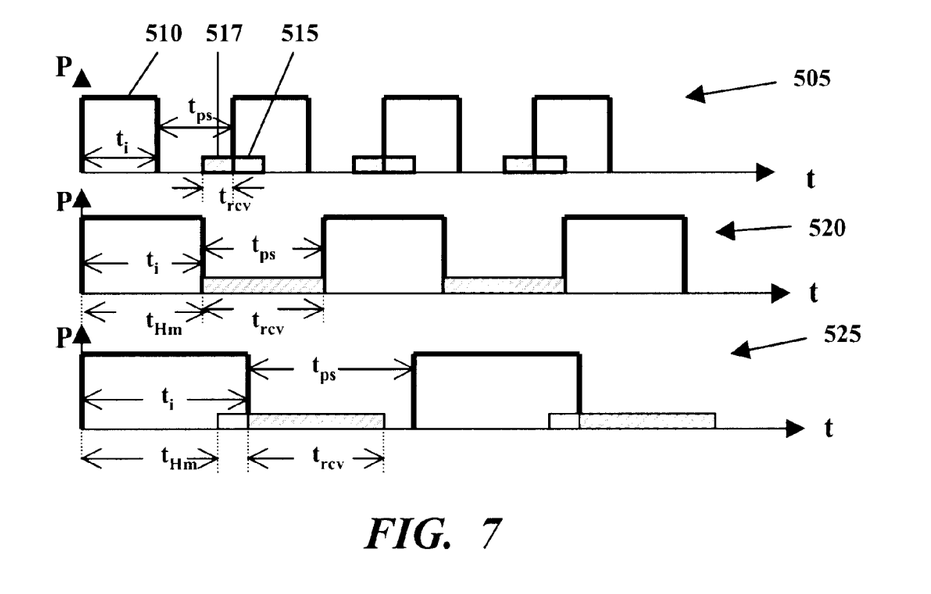
FIG. 7 is a timing diagram for use with FIG. 6 for maximum altitude $H_{max}$.
Figure 8:
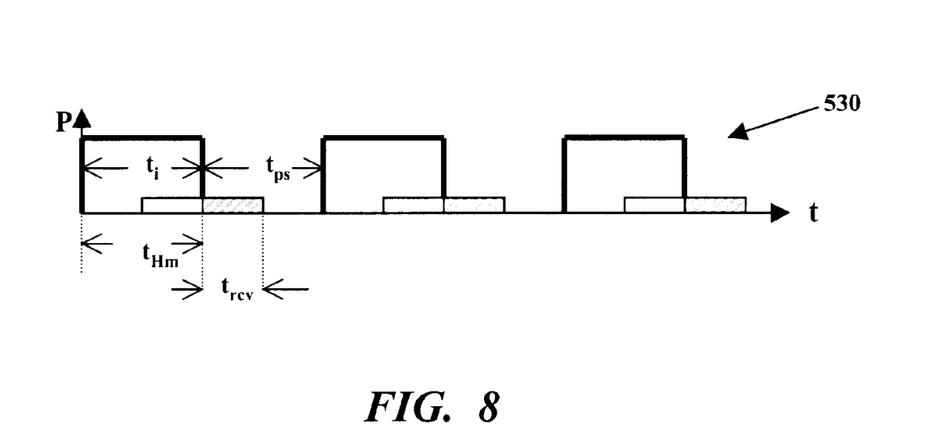
FIG. 8 is a timing diagram for use with FIG. 6 for $H_{max}/2$.

FIG. 6 shows two different aircraft positions for maximum altitude $H_{max}$ and $H_{max}/2$. FIG. 7 shows transmitter and ground echo signals for $H_{max}$. FIG. 8 shows transmitter and ground echo signals for $H_{max}/2$. In FIGS. 7 and 8, transmitter pulses are shown by bold lines as with pulse 510, ground echo signals are shown by normal lines as with pulse 515, and the effective time of their possible processing in the receiver $t_{rcv}$ by shading 517 on part of pulse 515.

The timing diagrams 505, 520, and 525 in FIG. 7 show that all of the pause interval $t_i$ may be utilized for reception of the echo ground signal at the maximum altitude $H_m$ only if $$t_i=t_{ps}=t_{H\,max}. \qquad \text{Equation 6}$$

The energy of the echo signal pulse is $$E=P_i t_{rcv} \qquad \text{Equation 7}$$

where $P_i$ is the peak power of the echo signal pulse. It is known that when H decreases, then $P_i$ increases inversely proportional to square of altitude $H^2$. As is shown in FIGS. 6, 7 and 8, waveform 530 for the altitude $H=H_{max}/2$ compared with waveform 520 for $H=H_{max}$ the energy of the echo signal pulse will increase not less than $2^2/2=2$ times. Thus at the constant repetition period $T_{rm}$ (see Equation 5) selected according to Equation 6 and with the current altitude of aircraft decreasing, the energy of the echo signal pulses at the receiver input increases. For example, at the typical values of altitude H of 8000 ft and critical altitude $H_{CR}$ of 400 ft the relative altitude variation is 8000/400=20 times. For the critical altitude $H_{CR}$, the energy of the pulse will be not less than $20^2/20=20$ times more than the energy at maximum altitude $H_{max}$. On the basis of this results, the ICW repetition period $T_{rm}$ is held constant for all altitudes and the period is $T_{rm}=32$ µs or a repetition frequency no more than 35 kHz.

In the CW mode typical signal parameters for the single antenna FM altimeter 200 of the present invention are frequency deviation $W_0$=130 MHz; constant FM period $T_{m0}$=1 ms; and variable beat frequency in accordance with Equation 1 for H=3 ft $f_H$=800 Hz, and for H=400 ft $f_H$=106 kHz; and $H_{CR}$=400 ft.

In the ICW mode, typical pulse modulation parameters are duty circle (DC)=$t_i/T_{rm}$=0.5; pulse repetition period $T_{rm}$=1/$F_{rm}$; and pulse repetition frequency $F_{rm}$=c/4$H_{max}$=31 kHz. At the maximum altitude $H_{max}$=8000 ft, $T_{rm}$=32 $\mu$s, and $t_i$=0.5×$T_{rm}$=16 $\mu$s. In the ICW mode, typical frequency modulation parameters are predetermined beat frequency $f_{Ho}$=0.5 kHz ($f_{Ho}$<<$F_{rm}$) and FM period $T_m$ variable in accordance with Equation 2.

To improve the accuracy of lower altitude measurements in the ICW mode, two or more altitude ranges may be used. For a lower altitude range, the pulse repetition period should be less than for a higher altitude range. For example, an altitude range from 8000 ft to 2000 ft with pulse repetition period of $T_{rm}$32 $\mu$s and a constant beat frequency $f_{Ho}$=0.5 kHz provides altitude accuracy of +/−1.55%. A second altitude range from 2000 ft to 400 ft with $T_{rm}$=8 $\mu$s and same constant beat frequency of 0.5 kHz results in an altitude accuracy of +/−0.4%.

Figure 9:
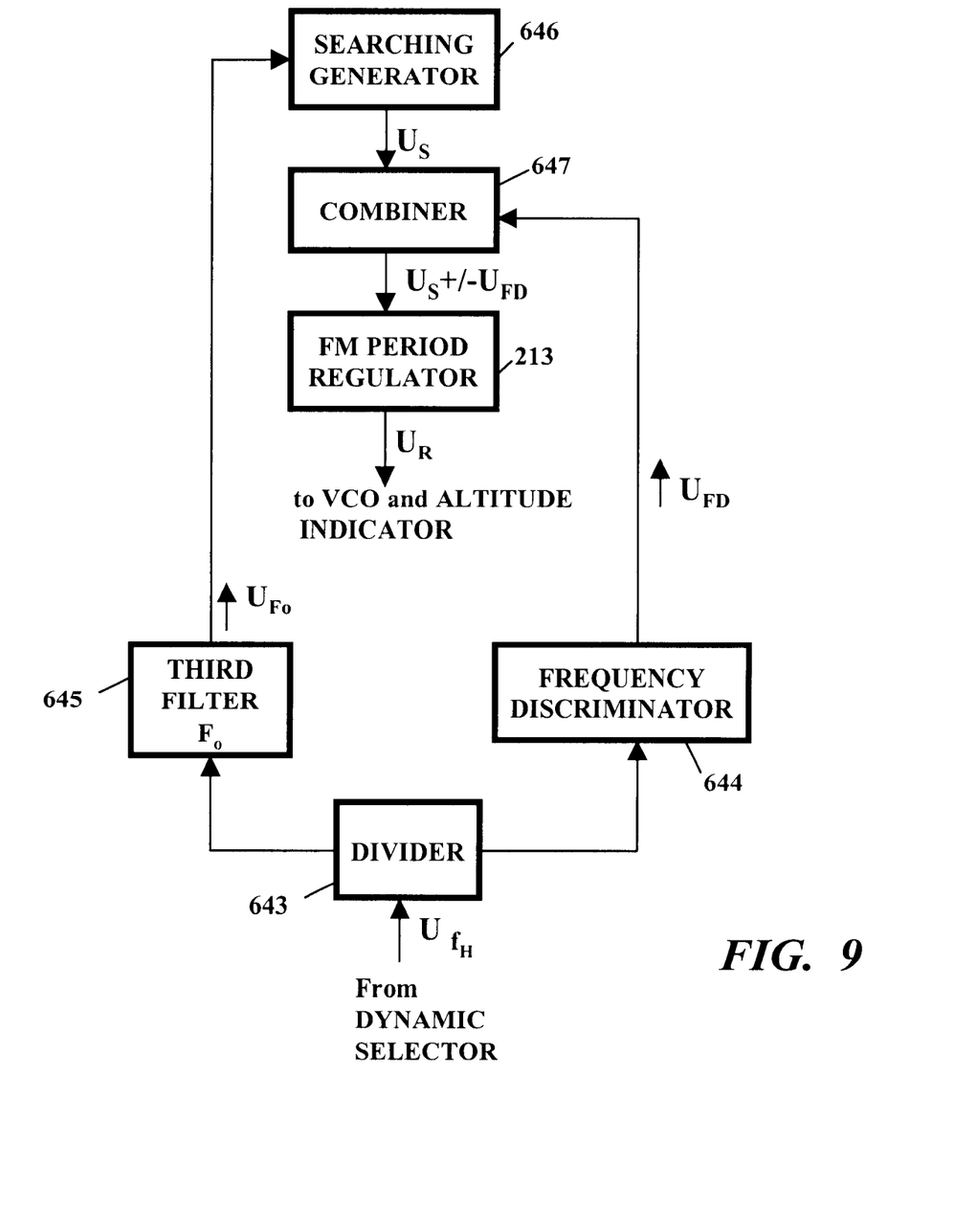
FIG. 9 is a diagram of an embodiment of a searching and tracking circuit and an FM period regulator utilized in the single antenna FM radio altimeter of FIG. 2.
Figure 10:
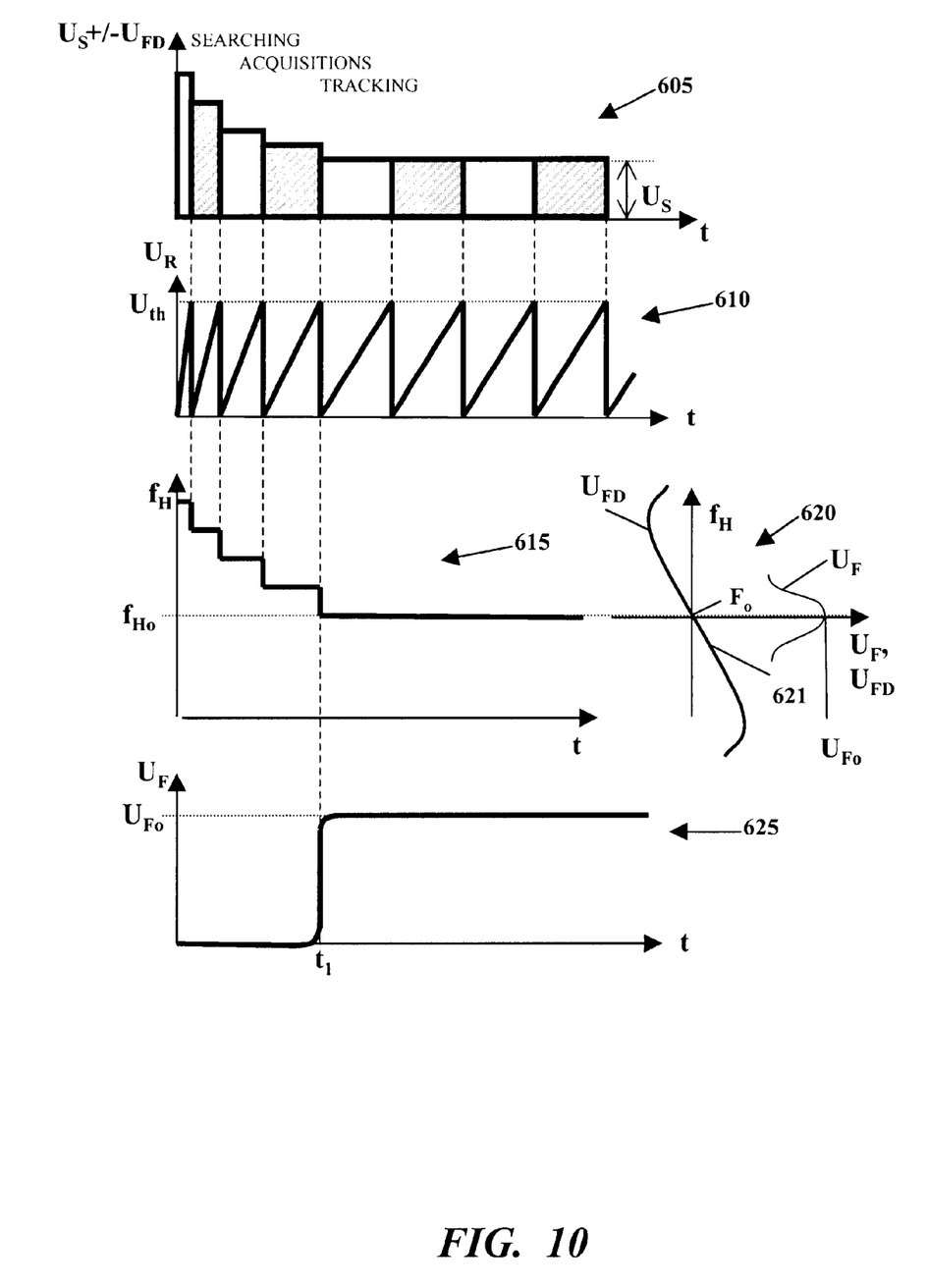
FIG. 10 is a graph showing waveforms produced by the embodiment of FIG. 9.

An embodiment of the searching and tracking circuit 212 of FIG. 2 is shown in FIGS. 9 and 10. An input signal from the dynamic selector 207 is divided in a divider 643 between a frequency discriminator 644 and a third filter 645. The third filter 645 is a narrow pass band filter with its output connected to a searching generator 646. The searching generator 646 is enabled by the third filter 645 and forms a programmed step-like searching voltage $U_s$. This searching voltage $U_s$ is combined in a combiner 647 with voltage $U_{FD}$ from the frequency discriminator 644 and a total voltage waveform $U_s$+/−$U_{FD}$ correction signal 605 is applied to the FM period regulator 213 to form a FM period control signal.

In FIGS. 9 and 10 the altimetric beat frequency signal $f_H$ input to the divider 643 is split and passed to the third filter 645. The third filter 645 has a narrow band pass characteristic with a center frequency at $f_{Ho}$. When searching is started the output of the third filter $U_F$ is zero as shown in waveform 625. The zero input to the searching generator 646 enables the step-like output $U_s$. The divided altimetric beat frequency signal $f_H$ input to the discriminator 644 provides an output $U_{FD}$ as shown in graph 620, which is a typical frequency discriminator characteristic known in the art. If the altimetric beat frequency $f_H$ is below the constant altimetric beat frequency $f_{Ho}$, the output $U_{FD}$ of the discriminator 644 follows the line 621 and is positive (+$U_{FD}$). If the altimetric beat frequency $f_H$ is above the constant altimetric beat frequency $f_{Ho}$, the output $U_{FD}$ of the discriminator 644 is negative (−$U_{FD}$). The discriminator 644 output $U_{FD}$ is added to the searching generator 646 output in combiner 647 to provide the output $U_s$+/−$U_{FD}$ correction signal as shown by waveform 605 in FIG. 10. As shown in waveform 615 at t=0, the altimetric beat frequency $f_H$ is above $f_{Ho}$ and the discriminator output is −$U_{FD}$ and the searching and tracking network 212 is in the searching mode. The searching generator 646 steps down to lower level steps as shown in waveform 605 as time increases (t>0). The FM period regulator 213 provides an output voltage $U_R$ FM period correction signal that increases linearly until it reaches the threshold level $U_{th}$ as shown in waveform 610. The FM period regulator 213 integrates the $U_s$+/−$U_{FD}$ curve to provide the saw tooth output 610 that modulates the VCO 201. In FIG. 10 waveform 610, a constant threshold voltage $U_{th}$ of the FM period regulator 213 corresponds to the constant frequency deviation $W_0$. As the searching generator 646 steps down as in waveform 605, the resulting altimetric beat frequency $f_H$ steps down as shown in waveform 615 and the discriminator 644 output decreases as shown in graph 620. The searching generator 646 continues to step down until the altimetric beat frequency $f_H$ reaches $f_{Ho}$ at some time $t_1$. At time $t_1$ with the beat frequency equal to $f_{Ho}$ the narrow third filter 645 passes the frequency $f_{Ho}$ and the output of the third filter 645 $U_F$ rises to $U_{Fo}$ to stop the searching generator 646 thus stopping search, acquiring the signal, and commencing tracking. The searching generator 646 output $U_s$ stays at a constant level in track mode after time $t_1$ as shown in waveform 605. The FM period regulator 213 when in track mode maintains a constant period saw tooth output FM period correction signal as shown in waveform 610.

When in track mode if the altimetric beat frequency $f_H$ deviates from the constant altimetric beat frequency $f_{Ho}$, the frequency discriminator 644 through the combiner 647 adds its input voltage $U_{FD}$ of corresponding value and sign to the searching generator 646 output $U_s$. The voltage $U_{FD}$ added to $U_s$ to form the correction signal 605 corrects the variable FM modulation period $T_m$ saw tooth voltage, and causes the altimetric beat frequency $f_H$ to equal $f_{Ho}$. At this time, the altimetric beat frequency $f_H$ is in the pass-band of the narrow band-pass third filter 645 and the altimeter remains in tracking mode with the constant altimetric beat frequency $f_{Ho}$. The constant altimetric beat frequency $f_{Ho}$ results in effective narrowing of the receiver bandwidth due to the narrow band-pass third filter 645 and a corresponding improvement of the signal-to-noise ratio at the ICW mode. The blocks of the searching and tracking network 212 (643, 644, 645, 646, and 647) and the FM period regulator 213 in FIG. 9 may be implemented in a coded form inside a digital processor.

Figure 11:
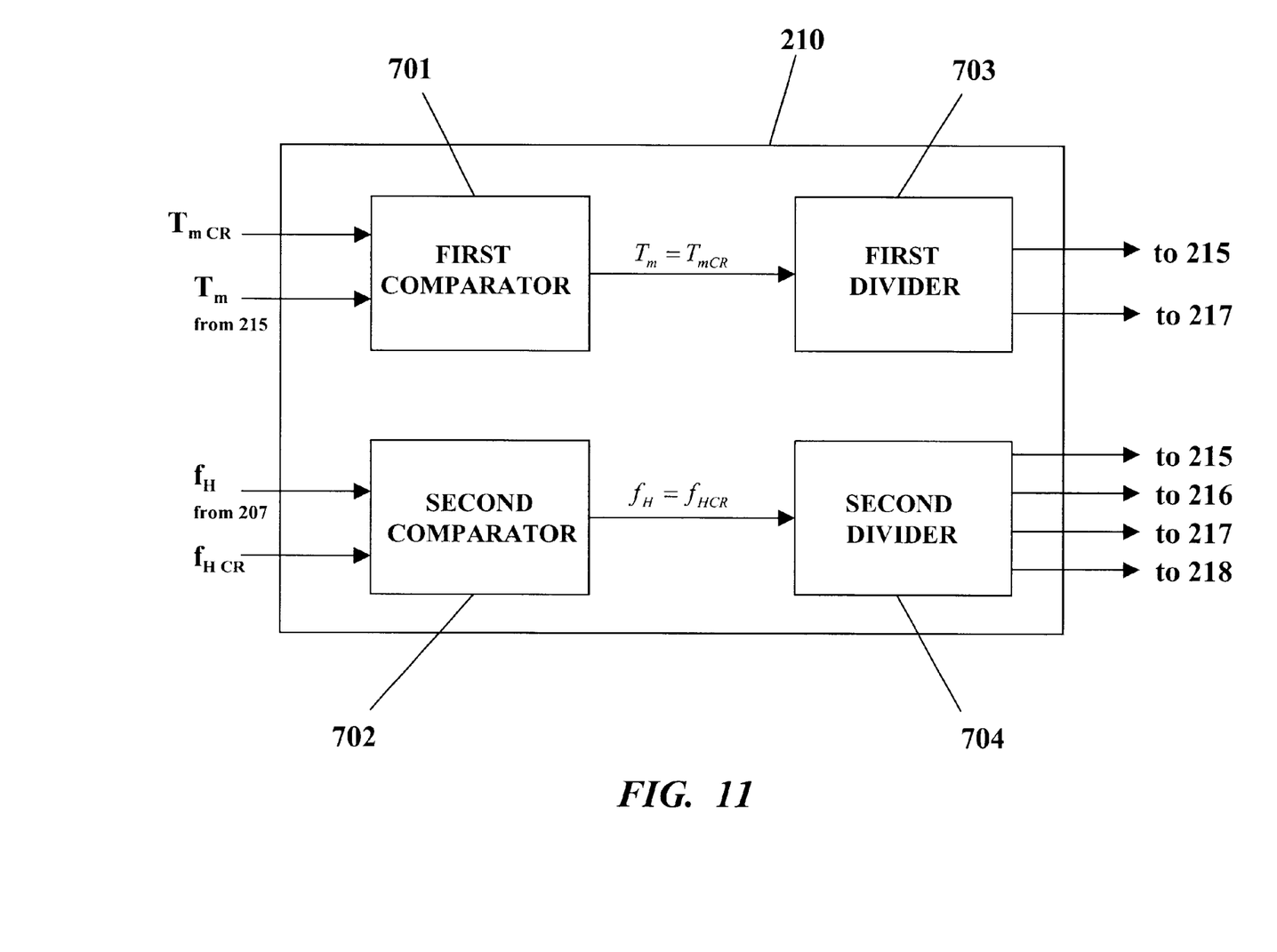
FIG. 11 is a diagram showing an embodiment of a comparator used in the antenna FM radio altimeter of FIG. 2.

An embodiment of the comparator 210 of FIG. 2 is shown in FIG. 11. In the ICW mode, the variable FM modulation period signal $T_m$ from the first switch 215 is applied to an input of a first comparator 701 that also receives a reference signal with the critical altitude modulation period signal $T_{mCR}$ at a second input of the first comparator 701. The first comparator 701 compares the periods of the two signals and produces an output signal that represents the comparison result for the two input signals indicating when $T_m \geq T_{mCR}$. The comparator output is applied to a first divider 703 that divides the input signal between two outputs connected to the first switch 215 and the third switch 217 for switching the FM radio altimeter 200 from the ICW mode to the CW mode. In the CW mode, the altimetric beat frequency signal $f_H$ from the dynamic selector 207 is applied to an input of a second comparator 702 that also receives a reference signal with the critical altitude reference beat frequency $f_{HCR}$. The second comparator 702 compares the two signals and produces an output signal that represents the comparison result for the two input signals indicating when $f_H \leq f_{HCR}$. The output signal from the second comparator 702 is applied to a second divider 704 that divides the input signal between four outputs connected to the first switch 215, the second switch 216, the third switch 217, and the fourth switch 218 for switching the FM radio altimeter 200 from the CW mode to the ICW mode. The first and second comparators 701 and 702 and the first and second dividers 703 and 704 may be implemented in code form in a digital signal processor.

All the above operations of the single antenna FM altimeter 200 of the present invention may be performed using equivalent structures known in the art. Additional functions and features may be added that would help to realize additional advantages of the single antenna FM altimeter without deviating from the scope of the present invention. Some additional features that may be added are described in the following paragraphs.

The nominal altimeter RF power output is 30 to 40 dB more at the maximum altitude in the ICW mode than the power needed at the critical altitude when in the CW mode to ensure operation at the maximum altitude. The transmitter power may be reduced by this amount when switching from the ICW mode to the CW mode at the critical altitude. Additional protection of the receiver 260 from parasitic signals in the CW mode may be provided by implementing automatic gain control techniques known in the art in the receiver 260. Additional protection of the receiver 260 from parasitic outside signals from different sources in both the CW and the ICW modes may be provided by connecting a limiter at the input of the preselector 204 in FIG. 2. A calibration network such as a delay line may be connected between the transmitter 250 and receiver 260 to provide a known delay equivalent to some altitude for built in test purposes. A noise source may be connected to the receiver 260 for self-test purposes as is known in the art.

In above description of the single antenna FM altimeter 200 of the present invention a saw tooth FM waveform is used. A triangular or any other FM waveform may be used with similar results. Constant coefficients in the equations may change with other than saw tooth waveforms.

It is believed that the single antenna FM radio altimeter of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A FM radio altimeter with a single antenna capable of operating in a continuous wave mode and an interrupted continuous wave mode for providing an altitude indication comprising:
    a transmitter for generating a continuous wave altimeter signal below a critical altitude and an interrupted continuous wave altimeter signal above a critical altitude;
    a circulator connected to the transmitter for coupling the continuous wave altimeter signal and the interrupted continuous wave altimeter signal to the single antenna;
    the single antenna connected to the circulator for radiating the continuous wave altimeter signal and the interrupted continuous wave altimeter signal and receiving a reflected continuous wave altimeter signal and a reflected interrupted continuous wave altimeter signal;
    a receiver connected to the circulator for receiving the reflected continuous wave altimeter signal and the reflected interrupted continuous wave altimeter signal and providing an altimetric beat frequency signal therefrom; and
    a processing function for providing the transmitter a constant period modulation signal below the critical altitude and a variable FM modulation period signal above the critical altitude, for comparing the altimetric beat frequency signal and the variable FM modulation period to critical altitude references and for switching the altimeter between the continuous wave mode and the interrupted continuous wave mode in accordance with the comparison, and for providing the altitude indication.

2. The altimeter of claim 1 wherein the transmitter further comprises:
    a voltage controlled oscillator for providing the continuous wave altimeter signal with the constant FM modulation period below the critical altitude and the variable FM modulation period above the critical altitude;
    a coupling element connected to the voltage controlled oscillator for providing a local oscillator signal coupled from the continuous wave altimeter signal;
    a power amplifier connected to the coupling element for amplifying the continuous wave altimeter signal; and
    a pulse modulator connected to the power amplifier for pulse modulating the power amplifier to provide the interrupted continuous wave altimeter signal above the critical altitude.

3. The altimeter of claim 2 wherein the pulse modulator turns the power amplifier on during transmit and off during receive to provide the interrupted continuous wave altimeter signal.

4. The altimeter of claim 2 wherein the receiver further comprises:
    a preselector connected to the circulator for amplifying and filtering the reflected continuous wave altimeter signal and the reflected interrupted continuous wave altimeter signal;
    a mixer connected to the preselector for mixing the reflected continuous wave altimeter signal and the reflected interrupted continuous wave altimeter signal with the local oscillator signal to provide a beat frequency signal;
    a fourth switch connected to the mixer and the coupling element for switching the local oscillator signal provided by the coupling element on during a receiving period and off during a transmitting period when in the ICW mode;
    a beat frequency amplifier connected to the mixer for amplifying the beat frequency signal;
    a filter connected to the beat frequency amplifier for filtering parasitic transmitter signals; and
    a dynamic selector connected to the filter for providing the altimetric beat frequency signal.

5. The altimeter of claim 4 wherein the filter is a notch filter to remove a parasitic transmitter signal due to reflections of the transmitted signal from the antenna.

6. The altimeter of claim 4 wherein the processing function further comprises:
    a comparator connected to the dynamic selector for comparing the altimetric beat frequency signal to a critical altitude reference beat frequency and for switching the altimeter from a continuous wave altimeter signal when the altimetric beat frequency signal is below the critical altitude reference beat frequency to an interrupted continuous wave altimeter signal when the altimetric beat frequency signal is above the critical altitude reference beat frequency and for switching the altimeter from the interrupted continuous wave altimeter signal when the variable FM modulation period is above the critical altitude reference modulation period to the continuous wave altimeter signal when the variable FM modulation period is below the critical altitude reference modulation period;
    a searching and tracking network connected to the dynamic selector for generating a correction signal when in the interrupted continuous wave mode for searching for the altimetric beat frequency signal, acquiring the altimetric beat frequency signal, and tracking the altimetric beat frequency signal;

a FM period regulator connected to the searching and tracking network for providing the variable FM modulation period signal in accordance with the correction signal in the interrupted continuous wave mode;

a first switch connected to the FM period regulator and the voltage controlled oscillator for providing the variable FM modulation period signal in the interrupted continuous wave mode and the constant modulation period in the continuous wave mode; and a third switch connected to the dynamic selector, the comparator, and the first switch for selecting the altitude indication from the dynamic selector in the continuous wave mode and from the FM period regulator in the interrupted continuous wave mode.

7. The altimeter of claim 6 wherein the comparator further comprises:

a first comparator connected to the first switch for comparing the variable FM modulation period to the critical altitude reference modulation period;

a first divider connected to the first comparator for providing switch control signals to the first switch and the third switch for switching the altimeter from the interrupted continuous wave mode to the continuous wave mode;

a second comparator connected to the dynamic selector for comparing the altimetric beat frequency to the critical altitude reference beat frequency; and a second divider connected to the second comparator for providing switch control signals to the first switch, the second switch, the third switch, and the fourth switch for switching the altimeter from the continuous wave mode to the interrupted continuous wave mode.

8. The altimeter of claim 6 wherein the searching and tracking network further comprises:

a divider for dividing the altimeteric beat frequency signal;

a band pass third filter connected to the divider for providing an enable signal when the beat frequency signal is not in the pass band and for turning off the enable signal when the beat frequency is in the pass band;

a searching generator connected to the bandpass third filter for providing a search waveform when receiving an enable signal from the bandpass third filter in a search mode and turning off the search waveform when the enable is turned off by the bandpass third filter in a acquisition and tracking mode;

a frequency discriminator connected to the divider for providing an output voltage indicative of the frequency; and a combiner connected to the frequency discriminator and the searching generator for combining the frequency discriminator and searching generator outputs for providing the correction signal.

9. The altimeter of claim 1 wherein the critical altitude reference is greater than the actual critical altitude when the altitude is increasing and the critical altitude reference is lower than the actual critical altitude when the altitude is decreasing.

10. A FM radio altimeter with a single antenna capable of operating in a continuous wave mode and an interrupted continuous wave mode for providing an altitude indication comprising:

a transmitter for generating a continuous wave altimeter signal below a critical altitude and an interrupted continuous wave altimeter signal above the critical altitude;

the single antenna connected to the transmitter for radiating the continuous wave altimeter signal and the interrupted continuous wave altimeter signal and receiving a reflected continuous wave altimeter signal and a reflected interrupted continuous wave altimeter signal;

a receiver connected to the single antenna for receiving the reflected continuous wave altimeter signal and the reflected interrupted continuous wave altimeter signal and providing an altimetric beat frequency signal indicative of the altitude in the continuous wave mode;

a comparator connected to the receiver and the transmitter for receiving the altimetric beat frequency signal, comparing the altimetric beat frequency signal to a critical altitude beat frequency reference, comparing a variable FM modulation period to a critical altitude modulation reference, and for switching the altimeter between the continuous wave mode and the interrupted continuous wave mode in accordance with the comparisons; and a searching and tracking network connected to the receiver and the transmitter and operational when in the interrupted continuous wave mode for generating a correction signal to the variable FM modulation period signal for the transmitter to search for the altimetric beat frequency signal, for acquiring the altimetric beat frequency signal when the altimetric beat frequency signal equals a constant beat frequency signal, and for tracking the altimetric beat frequency signal and for providing the altitude indication from the period of the variable FM modulation period signal.

11. The altimeter of claim 10 further comprising a circulator connected to the transmitter and to the single antenna to couple the transmitter signal to the antenna and connected to the receiver to couple the single antenna to the receiver and to provide isolation for the receiver from the transmitter.

12. The altimeter in claim 10 wherein the transmitter generates a continuous wave altimeter signal with a constant frequency modulation period below the critical altitude and an interrupted continuous wave altimeter signal with the variable FM modulation period above the critical altitude.

13. The altimeter of claim 12 wherein the transmitter further comprises a pulse modulator to pulse modulate the transmitter to provide the interrupted continuous wave signal.

14. The altimeter of claim 13 wherein the transmitter further comprises:

a voltage controlled oscillator for providing a continuous wave altimeter signal with the constant frequency modulation period below the critical altitude and with the variable FM modulation period above the critical altitude;

a coupling element connected to the voltage controlled oscillator for providing a local oscillator signal coupled from the continuous wave altimeter signal; and a power amplifier connected to the coupling element for amplifying the continuous wave altimeter signal and to the pulse modulator wherein the pulse modulator pulse modulates the power amplifier to provide the interrupted continuous wave signal.

15. The altimeter of claim 14 wherein the receiver further comprises:

a preselector connected to the antenna for amplifying and filtering the reflected continuous wave altimeter signal and the reflected interrupted continuous wave altimeter signal;

a mixer connected to the preselector for mixing the reflected continuous wave altimeter signal and the reflected interrupted continuous wave altimeter signal with the local oscillator signal to provide a beat frequency signal;

a fourth switch connected to the mixer and the coupling element for switching the local oscillator signal provided by coupling element on during the receive mode and off during the transmit mode when in the ICW mode;

a beat frequency amplifier connected to the mixer for amplifying the beat frequency signal;

a filter connected to the beat frequency amplifier for filtering parasitic transmitter signals; and a dynamic selector connected to the filter for providing the altimetric beat frequency signal.

16. The altimeter of claim 15 wherein the filter is a notch filter to remove a parasitic transmitter signal due to reflections of the transmitted signal from the antenna.

17. The altimeter of claim 10 further comprising:

a FM period regulator connected to the searching and tracking network for providing the variable FM modulation period signal in accordance with the correction signal in the interrupted continuous wave mode;

a first switch connected to the FM period regulator for providing the variable FM modulation period signal in the interrupted continuous wave mode and the constant modulation period control signal in the continuous wave mode; and a third switch connected to the dynamic selector, the first switch, and the comparator for selecting the altitude indication from the dynamic selector in the continuous wave mode and from the FM period regulator in the interrupted continuous wave mode.

18. The altimeter of claim 10 wherein the comparator further comprises:

a first comparator connected to the first switch for comparing the variable FM modulation period to the critical altitude reference modulation period;

a first divider connected to the first comparator for providing switch control signals to the first switch and the third switch for switching the altimeter from the interrupted continuous wave mode to the continuous wave mode;

a second comparator connected to the dynamic selector for comparing the altimetric beat frequency to the critical altitude reference beat frequency; and a second divider connected to the second comparator for providing switch control signals to the first switch, the second switch, the third switch, and the fourth switch for switching the altimeter from the continuous wave mode to the interrupted continuous wave mode.

19. The altimeter of claim 10 wherein the searching and tracking network further comprises:

a divider for dividing the altimetric beat frequency signal;

a band pass third filter connected to the divider and for providing an enable signal when the beat frequency signal is not in the pass band and for turning off the enable signal when the beat frequency is in the pass band;

a searching generator connected to the bandpass third filter and providing a search waveform when receiving an enable signal from the bandpass third filter in a search mode and turning off the search waveform when the enable is turned off by the bandpass third filter in a acquisition and tracking mode;

a frequency discriminator connected to the divider for providing an output voltage indicative of the frequency; and a combiner connected to the frequency discriminator and the searching generator for combining the frequency discriminator and searching generator outputs for providing the correction signal.

20. The altimeter of claim 10 wherein the critical altitude reference for switching from the continuous wave mode to the interrupted continuous wave mode is greater then the critical altitude reference for switching from the interrupted continuous wave mode to the continuous wave mode.

21. The altimeter of claim 10 wherein the critical altitude reference for switching from the continuous wave mode to the interrupted continuous wave mode is less then the critical altitude reference for switching from the interrupted continuous wave mode to the continuous wave mode.

* * * * *